(12) United States Patent
Barlia

(10) Patent No.: US 6,889,388 B1
(45) Date of Patent: May 10, 2005

(54) GARMENT WITH LIQUID CRYSTAL THERMOMETER

(76) Inventor: Elias Barlia, 2634 Rockvalley Rd., Metamora, MI (US) 48455

( * ) Notice: Subject to any disclaimer, the term of this patent is extended or adjusted under 35 U.S.C. 154(b) by 201 days.

(21) Appl. No.: 10/400,810

(22) Filed: Mar. 27, 2003

(51) Int. Cl.$^7$ .............................................. A41D 13/02
(52) U.S. Cl. ............................................................ 2/82
(58) Field of Search ............................ 2/82, 16, 22, 24, 2/46, 62, 69, 242, 79, 227, 23, 2.15, 2.16, 2.17; 36/1.5, 2 R, 109, 4

(56) References Cited

U.S. PATENT DOCUMENTS

| | | | |
|---|---|---|---|
| 3,367,319 A | * 2/1968 | Carter ........................ 126/204 |
| 3,660,849 A | * 5/1972 | Jonnes et al. ................. 2/2.15 |
| 3,861,213 A | 1/1975 | Parker |
| 3,893,340 A | 7/1975 | Parker |
| 3,980,581 A | 9/1976 | Godsey, Jr. et al. |
| 3,998,098 A | 12/1976 | Chilton |
| 4,070,912 A | 1/1978 | McNaughtan et al. |
| 4,079,539 A | 3/1978 | Holstein |
| 4,138,889 A | * 2/1979 | Fraschini .................... 374/160 |
| 4,198,861 A | 4/1980 | Mung-Kuen Luk |
| 4,220,680 A | 9/1980 | Corsi |
| 4,244,220 A | 1/1981 | Henson et al. |
| 4,301,054 A | 11/1981 | Buirley et al. |
| 4,339,207 A | 7/1982 | Hof et al. |
| 4,362,645 A | 12/1982 | Hof et al. |
| 4,385,844 A | 5/1983 | Fergason |
| 4,509,533 A | 4/1985 | Chervitz |
| 4,650,707 A | 3/1987 | Crigger |
| 4,747,413 A | 5/1988 | Bloch |
| 4,761,835 A | * 8/1988 | Chen ............................. 2/160 |
| 4,773,767 A | 9/1988 | Coll |
| 4,779,995 A | 10/1988 | Santacaterina et al. |
| 4,878,588 A | 11/1989 | Ephraim |
| 4,918,851 A | * 4/1990 | Peikin ............................ 43/1 |
| 5,072,540 A | 12/1991 | Monzyk et al. |
| 5,165,798 A | 11/1992 | Watanabe |
| 5,301,668 A | 4/1994 | Hales |
| 5,304,003 A | 4/1994 | Winninger |
| 5,312,187 A | 5/1994 | Chiu |
| 5,320,137 A | 6/1994 | Huang |
| 5,366,491 A | * 11/1994 | Ingram et al. .............. 607/108 |
| D365,290 S | 12/1995 | Burchett |
| 5,588,747 A | 12/1996 | Blevins |
| 5,645,196 A | 7/1997 | Hancuff |
| 5,692,238 A | * 12/1997 | Watson, Jr. .................... 2/102 |
| 5,738,442 A | 4/1998 | Paron et al. |
| 5,802,611 A | * 9/1998 | McKenzie et al. ............... 2/69 |
| 6,257,759 B1 | 7/2001 | Witonsky et al. |
| 6,324,963 B1 | 12/2001 | Cirasole |

OTHER PUBLICATIONS

LL Bean Fly Fishing 2003, Catalog, pp. 69–75.
The Fly Shop, 2003 Summer Catalog & Travel Digest, pp. 30–31.
Cabela's Fly Fishing 2003 Catalog, pp. 146–159.
Orvis Sporting Traditions Fly Fishing Catalog Spring 2003.
Thermographics of Ohio, ASI 9110 catalog.
Hallcrest, Temperature Indicating Technology Catalog.

* cited by examiner

*Primary Examiner*—Tejash Patel
(74) *Attorney, Agent, or Firm*—Reising, Ethington, Barnes, Kisselle, P.C.

(57) ABSTRACT

An outdoor sports garment such as fisherman's waders (10) has an encased liquid crystal thermometer (20) adhered to the outer surface of the garment for viewing by the wearer.

22 Claims, 3 Drawing Sheets

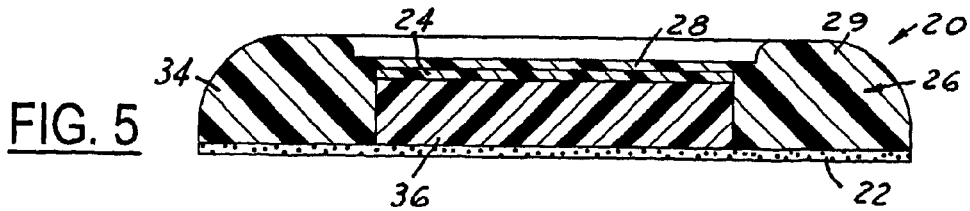
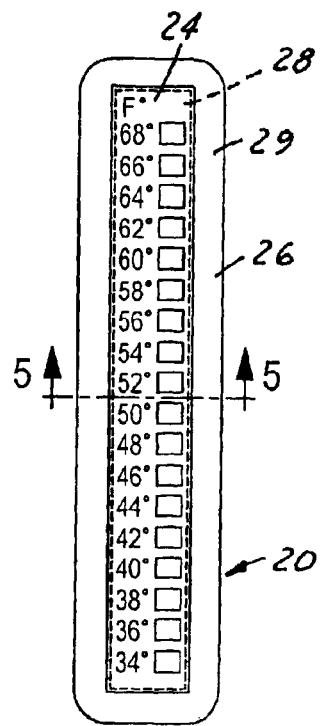
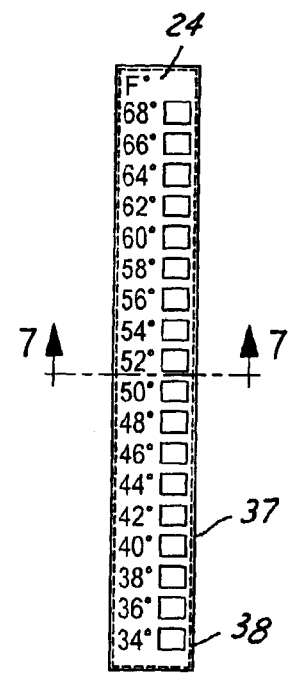
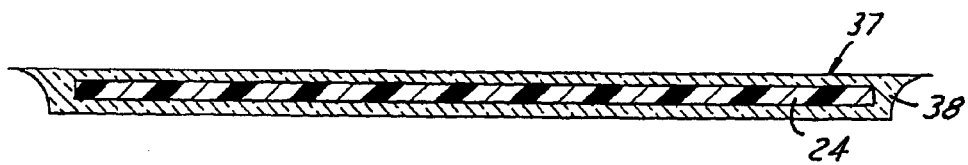
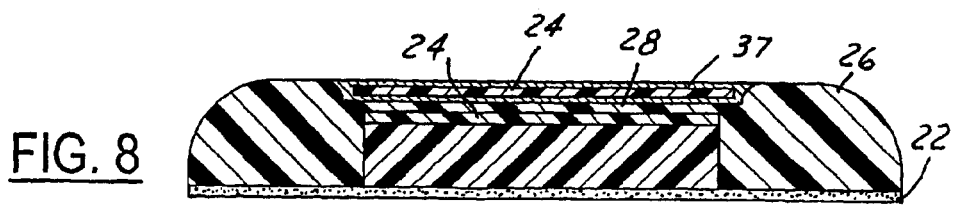

GARMENT WITH LIQUID CRYSTAL THERMOMETER

TECHNICAL FIELD

The field of this invention relates to thermometers for outdoor sportsmen.

BACKGROUND OF THE DISCLOSURE

Outdoor sportsmen have a need for determining the ambient temperature whether it is the ambient air or ambient water temperature. The temperature is important for two reasons. Firstly, the temperature should be known to assure adequate protective measures are taken against any cold weather. Secondly, hunters and fisherman need to known the temperature because temperature and the relative change of temperature affects the behavior of the animals or fish. A good sportsman takes animal behaviour into account during a sporting event such as hunting or fishing.

Commercially available thermometers have certain limitations and risks. Thermometers containing mercury pose a known environmental hazard due to the mercury content and the risk of spillage of the mercury into the outdoor environment. While alcohol based thermometers do not pose the same severity of environmental risk, the alcohol still needs to be encased in a glass tube. The glass tube is prone for breakage and in order to reduce the probability of breakage, the glass tube is housed in a metal housing with a viewing window. The metal housing has a loop for attachment to a chain, string or lanyard. In addition, the thermometer may have a clip for storage to a shirt or pants pocket.

For accurate reading of the ambient surrounding, the thermometer must then be removed from the pocket and a certain amount of time must elapse before an accurate reading is obtained. If the thermometer is hanging from the lanyard into the water, the lanyard must be pulled to retrieve the thermometer and then handled for reading. Furthermore, the thermometer can get separated from the lanyard and a person can easily lose it.

Liquid crystal digital thermometers have been known to be used in fishing environments. A separate plastic coated card with every 5° C. can be held beneath the water surface and retrieved and handled for reading. Furthermore, this type of thermometer can also be separated and lost just like regular analog thermometers. These scenarios make the presently known thermometers to be relatively inconvenient, cumbersome and subject to being is placed.

Electronic digital thermometers have seen much commercial acceptance in other fields but they have two main disadvantages for outdoor sportsmen. Firstly, they are relatively expensive and secondly they require a power source which must be sealed from the elements. The power source may be depleted during use without any way to replenish the power when in field use, i.e., in a remote forest or remote mountain.

What is needed is a convenient non-powered thermometer that is readily available for an accurate reading of the ambient surrounding by secure attachment to an outer sports garment. What is needed is a flexible liquid crystal thermometer that flexes with the outer garment and is adhered to a convenient location on the outer garment. What is also needed is a thermometer for use in rugged outdoor conditions safe for both the wearer and the environment.

SUMMARY OF THE DISCLOSURE

In accordance with one aspect of the invention, a protective outer sports garment for a wearer includes an area on the sports garment with a heat insulation layer to reduce body heat from passing outward therethrough. A flexible liquid crystal thermometer is connected to an exterior side of the sports garment over the heat insulation material and positioned to be viewed by the wearer. The liquid crystal thermometer is in thermal connection to the ambient exterior over the heat insulation material for providing temperature indication of the ambient exterior with insignificant thermal loads registering from the wearer.

Preferably, the garment is in the form of fishing waders and has a waterproof layer below the heat insulation material. The liquid crystal thermometer is waterproof for submersion in ambient water.

It is also desirable, that the liquid crystal thermometer is encased in a clear elastomeric material of which a portion of the plastic material under the liquid crystal thermometer is the heat insulation layer. In one embodiment, the clear plastic material has an upper portion forming a recess window through which liquid crystal thermometer is viewed. The lower surface of the clear plastic material is adhered onto the outer sports garment by a waterproof adhesive material.

The recess window is shaped to receive a replacement liquid crystal thermometer. The replacement liquid crystal thermometer element is encased in a second housing shaped to be received and adhered to the recess window.

It is also desirable in an alternate embodiment that the garment is a winter outdoor weather protective garment. The liquid crystal thermometer registers temperature below freezing on the garment which has built-in heat insulation material.

In another embodiment, a housing member has a lower surface with an adhesive bond to the garment. A thermometer element is encased in a secondary housing and is adhered to the upper surface of the housing member with an adhesive bond that is weaker than the adhesive bond of the housing member to the garment.

In accordance with another aspect of the invention, a fisherman's waders includes a thermometer device adhered onto a leg section of the waders for submersion into fishing water and registering the ambient temperature of the fishing water. The thermometer device is positioned to be directly viewable by a wearer of the waders. Preferably, the thermometer device is a flexible liquid crystal thermometer attached onto one of an upper leg section or lower leg section of the waders.

In accordance with another aspect of the invention, a sports thermometer includes a flexible liquid crystal thermometer encased in clear plastic for being water proof. The casing has an adhesive backing for adhering the thermometer onto the exterior of an outdoor sports garment.

BRIEF DESCRIPTION OF THE DRAWINGS

Reference now is made to the accompanying drawings in which:

FIG. 4 is a top plan view of the liquid crystal thermometer shown in FIG. 3;

FIG. 5 is a cross sectional view taken along lines 5—5 shown in FIG. 4.

FIG. 6 is a top plan view of a replacement liquid crystal thermometer for connection to the one shown in FIG. 1;

FIG. 7 is a cross sectional view taken along the lines 7—7 shown in FIG. 6;

FIG. 8 is a side elevational view of view similar to FIG. 5 with the replacement thermometer installed thereon;

DETAILED DESCRIPTION OF THE PREFERRED EMBODIMENT

Figure 1:
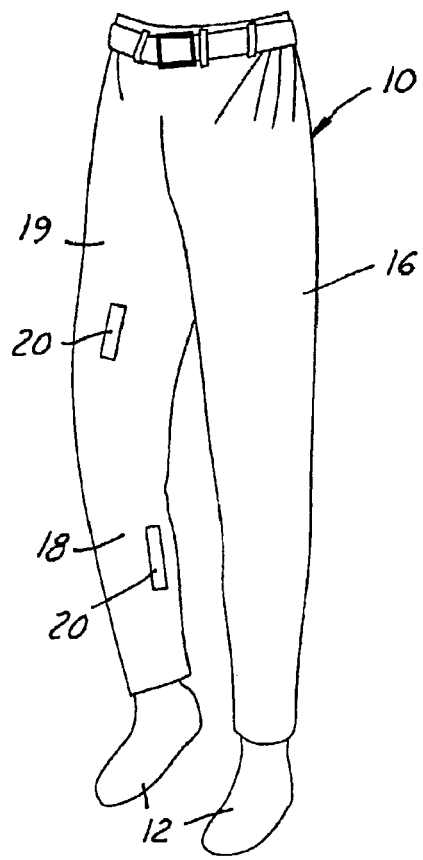
FIG. 1 is a perspective view of a fisherman's waders in accordance with one embodiment of the invention.
Figure 2:
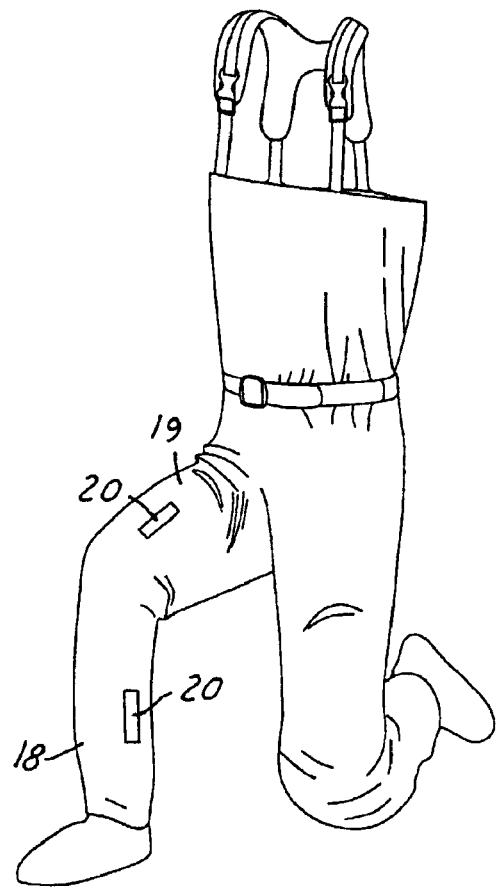
FIG. 2 is a view of the waders in one position for indicating ambient temperature of ambient water.

Referring now to FIG. 1, a pair of waders 10 has the typical boots 12 and leggings 16. A non-powered liquid crystal thermometer 20 is attached to either the lower leg portion 18 on the inside calf, or at the upper leg portion 19 above the knee or both positions as shown. The position of the liquid crystal thermometer 20 is determined by what is most convenient for a fisherman to view the thermometer when in the water. One such position just above the knee is convenient when the fisherman is kneeling such as the wader position shown in FIG. 2. The lower position is satisfactory when the fisherman is able to lift a leg without jeopardizing has stance to view the lower thermometer 20.

The liquid crystal thermometer is attached by a water proof adhesive layer 22 as shown in FIG. 5 to the waders to be permanently affixed thereto. The liquid crystal thermometer is constructed to indicate the ambient temperature of the ambient exterior and eliminate or significantly reduce or minimize the effect of any body heat emanating from the wearer. In order to achieve this objective, a liquid crystal thermometer element 24 is encased in a clear transparent elastomeric casing 26 made from silicone or urethane which spaces and insulates the liquid crystal element 26 from the human body as shown in FIGS. 3–6.

Figure 3:
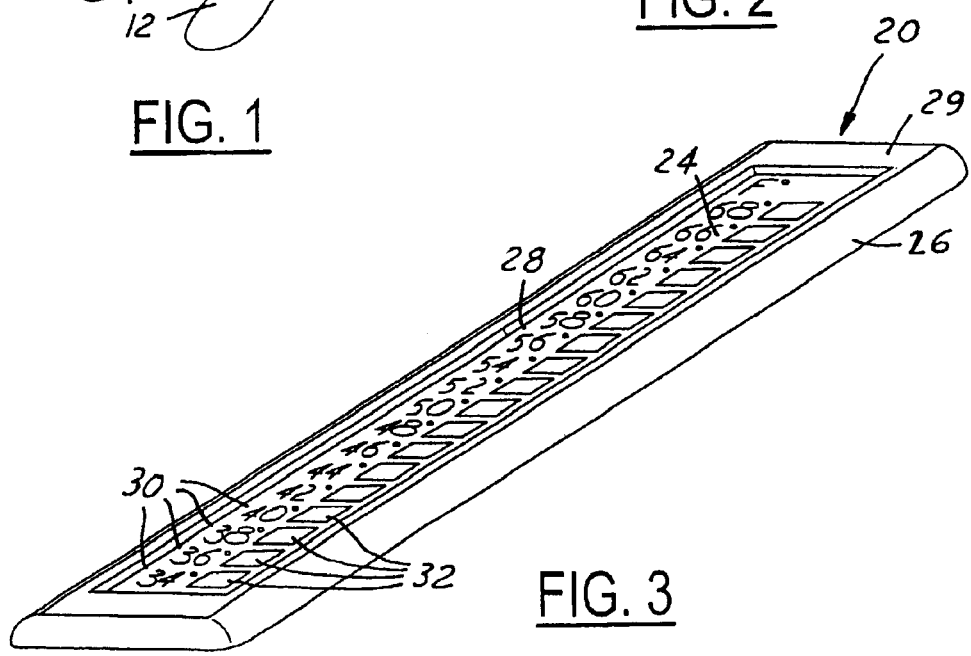
FIG. 3 is an enlarged perspective view of the liquid crystal thermometer shown in FIG. 1.

As shown in FIGS. 3 and 5 the casing has a top recessed flat window 28 through which the indica 30 and the thermometer elements 32 also called an event are visible. As in conventional liquid crystal thermometers, each thermometric element 32, also called an event, is set to change to a particular distinctive color when the temperature as indicated by the indicia is registered. This occurrence thereby shows a highlighted or distinctive color at or near the registered temperature when the other elements 32 are a much darker color, such as black or navy blue. It is foreseen the elements have a rectangular shape positioned adjacent the indicia 30. However, other designs such as indicia 30 within the rectangular display of the element 32 can be used. Other shapes such as ovals or circles may also be used for the elements 32. The range of display is foreseen to be between 34° and 68° F. at every 2° F. for use with the fisherman waders The liquid crystal element 24 is positioned in a main casing section 34 just below the window 28 and then a case plug 36 is positioned in place and adhesively secured or sonically welded in place to assure a water tight seal for the liquid crystal display element. The adhesive layer 22 is then applied to the bottom of the casing 26 along with a protective plastic or paper peel away layer (not shown) for transportation and handling purposes until installation onto the waders 10. The adhesive layer 22 along the casing 26 may also help insulate from the body heat.

The housing 26 may also be used for advertising or embossing brand names on the perimeter 29 that circumscribes recess member 28.

While most waders 10 have useful life of about three years or more depending on usage, most liquid crystal element manufacturers only warranty the liquid crystal display for one year. Thus, while the casing 26 protects the liquid crystal thermometer element 24 from harmful humidity and ultraviolet radiation, there is a possibility that the thermometer element 24 may not last the full term for most waders. In order to assure that the waders can be fully used their entire live expectancy before their durability is completely spent, it may therefore be necessary to repair or replace the liquid crystal element. In such instances, it is foreseen that a liquid crystal replacement path 37 as shown in FIGS. 6 and 7 can be installed on top of the recessed window 28 as shown in FIG. 8. The patch as shown in FIGS. 6 and 7 has a similar liquid crystal element 24 encased in a urethane or other clear plastic secondary housing 38 for rendering the liquid crystal element 24 weather resistant. The housing 38 is then adhered to the window 28 as shown in FIG. 8. While after the patch is installed the liquid crystal element 24 has a flush appearance relative to the top of the casing 26 and the recessed appearance of the window 28 is eliminated. The original liquid crystal element 24 which is no longer functional is now concealed below the path 37 and upper liquid crystal element 24.

It is also foreseen that other outdoor water sport applications are possible. The liquid crystal thermometer 20 may be applied to a sleeve of a wet suit for water sports such as snorkeling or diving. It may also be applied to gravel guards on a pair of waders.

Figure 9:
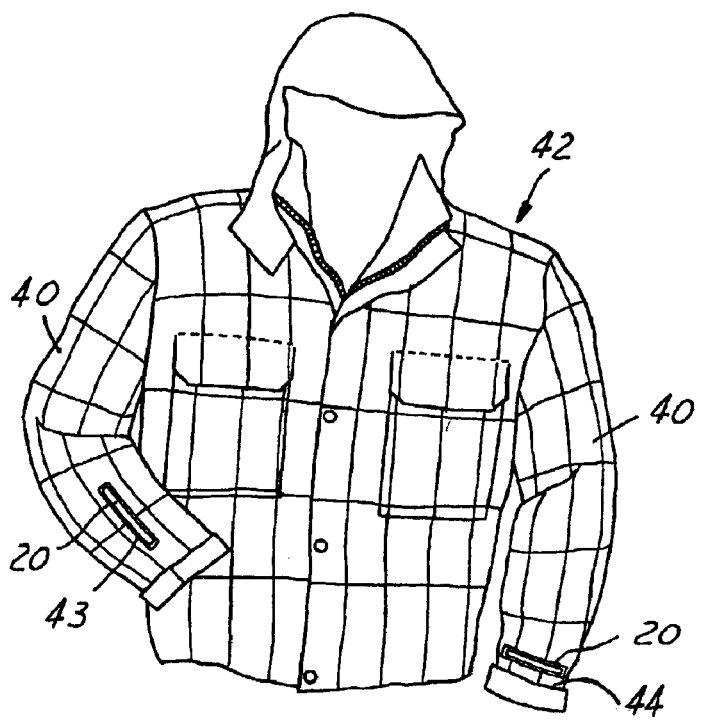
FIG. 9 is a view showing a outdoor upper garment with a liquid crystal thermometers connected to two positions on the sleeves.

It is also foreseen that this invention is applicable for other outdoor sports fields where cold weather gear is used. As shown in FIG. 9, the liquid crystal thermometer 20 may be adhered to a sleeve 40 of a parka or jacket 42 in either a longitudinal position as shown in the right sleeve portion 43 or laterally across a bottom portion 44 of sleeve 40 as shown in the left arm. The liquid crystal thermometer 20 on either sleeve 40 has the same basic structure as heretofore described. The thermometer on the bottom portion 44 of the sleeve 40 may be contoured to more appropriately wrap about the bottom portion contour. The parka 42 may also insulated for cold weather usage which further reduces the effect of body heat on the temperature element 24 and provides for an accurate thermometer reading of the ambient atmosphere.

The liquid crystal element 24 therein may have a different range of temperatures for the cold weather parka. Depending on the intended usage and insulation on the parka, ranges may vary from the range mentioned for the fishing waders. A range of, for example, −25° C. to 4° C. (−13° F. to 40° F.) is suitable for most moderate cold weather usage such as hunting or moderate mountain climbing or snowboarding and snow skiing. Liquid crystals covering such ranges are now commercially available. As liquid crystal cold weather ranges increase, applications may be extended to extreme cold weather usage such as high mounting climbing or for Artic or Antarctica usage which may extend significantly below the −25° C. mark.

Figure 10:
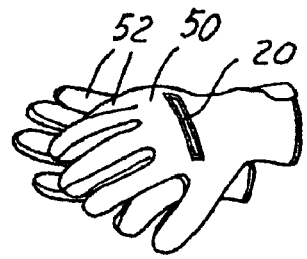
FIG. 10 is a view of a glove with a liquid crystal thermometer attached on the back side thereof.

FIG. 10 shows a liquid crystal thermometer 20 mounted across the back side 50 of a cold weather glove 52. Again the insulation in the glove also reduces the effect of body heat on the liquid crystal element 24 to allow an accurate reading of the ambient air. The casing 20 may be sufficiently flexible to be normally contoured to complement the contour of the backside of the glove 52. Again the position on the backside of the glove alloys easy reading of the thermometer for the wearer.

Figure 11:
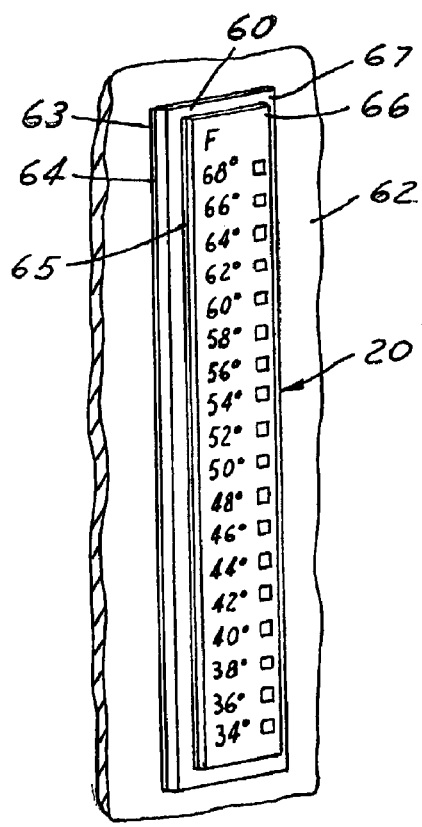
FIG. 11 is a perspective view of an alternate embodiment of a garment with an attached liquid crystal thermometer.

An alternate embodiment of thermometer 20 is shown in FIG. 11, in this embodiment, a first housing 60 is secured to garment 62 through a first adhesive bond layer 63 at its lower surface 64. The liquid crystal thermometer element 24 is encased against humidity and ultra violet damage in a secondary housing 66. The secondary housing 66 is attached to an upper surface 67 of housing 60 with an adhesive bond layer 65 therebetween the that is weaker than the adhesive bond between housing 60 and garment 62. Different commercially appropriate waterproof adhesives may be used for each layer. Each of the bond layers 63 and 65 may be substituted with Velcro™ hook & loop type fastener systems of varying adhesion or lock and tear ratings.

Other variations and modifications are possible without departing from the scope and spirit of the present invention as defined by the appended claims.

The embodiments in which an exclusive property or privilege is claimed are defined as follows:

1. A protective outer sports garment comprising:
   an area on said sports garment with a heat insulation layer to reduce body heat from passing therethrough;
   a flexible non-powered liquid crystal thermometer connected on an exterior side of the sports garment over the heat insulation material and positioned to be viewed by the wearer;
   said liquid crystal thermometer being in thermal connection to the ambient exterior over the heat insulation material for providing temperature indication of the ambient exterior with insignificant thermal loads registering from said wearer;
   said garment being fishing waders and having a waterproof layer below said heat insulation material;
   said liquid crystal thermometer registering temperatures of ambient liquid water and being waterproof for submersion in ambient water when said waders are in said ambient water.

2. A protective outer sports garment as defined in claim 1 further comprising:
   said liquid crystal thermometer being encased in a clear plastic housing of which a portion of the plastic housing under the liquid crystal thermometer being said heat insulation layer.

3. A protective outer sports garment as defined in claim 2 further comprising:
   said clear plastic material having an upper portion forming a recess window through which liquid crystal thermometer is viewed;
   said recess window being shaped to receive a replacement liquid crystal thermometer.

4. A protective outer sports garment as defined in claim 3 further comprising:
   a replacement liquid crystal thermometer element encased in a clear plastic second housing shaped to be received and adhered to the recess window.

5. A protective outer sports garment as defined in claim 3 further comprising:
   said lower surface of said clear plastic housing being adhered onto said outer sports garment by a waterproof adhesive material.

6. A protective outer sports garment as defined in claim 1 further comprising:
   a housing member having a lower surface with an adhesive bond for attachment to said garment;
   said liquid crystal thermometer having a thermometric element encased in a secondary housing;
   said secondary housing adhered to an upper surface of said housing member with an adhesive bond that is weaker than the adhesive bond of the housing member to the garment.

7. A fisherman's waders comprising:
   a thermometer device adhered onto a leg section of said waders for submersion into fishing water and registering the ambient temperature of said fishing water;
   said thermometer device being positioned to be directly viewable by a wearer of said waders;
   said thermometer device being a flexible liquid crystal thermometer attached onto one of an upper leg section or lower leg section of said waders; and
   a heat insulation layer under the flexible liquid crystal thermometer.

8. A sports thermometer for attachment to an outdoor sports garment comprising:
   a flexible liquid crystal thermometer encased in clear plastic housing for being water proof;
   an adhesive backing for adhering said liquid crystal thermometer onto the exterior of an outdoor sports garment; and
   a heat insulation layer between the adhesive and the liquid crystal thermometer.

9. A protective outer sports garment comprising:
   a waterproof layer;
   an area on said sports garment with a heat insulation layer adjacent the waterproof of layer to reduce body heat from passing therethrough;
   flexible non-powered crystal thermometer connected on an exterior side of the sports garment over the heat insulation material and positioned to be viewed by the wearer;
   said liquid crystal thermometer being in thermal connection to the ambient exterior over the heat insulation material for providing temperature indication of the ambient exterior with insignificant thermal loads registering from said wearer.

10. A protective outer sports garment as defined in claim 9 further comprising:
    said liquid crystal thermometer being encased in a clear plastic housing of which a portion of the plastic housing under the liquid crystal thermometer being said heat insulation layer.

11. A protective outer sports garment as defined in claim 10 further comprising:
    said clear plastic material having an upper portion forming a recess window through which liquid crystal thermometer is viewed;
    said recess window being shaped to receive a replacement liquid crystal thermometer.

12. A protective outer sports garment as defined in claim 11 further comprising:
    a replacement liquid crystal thermometer element encased in a clear plastic second housing shaped to be received and adhered to the recess window.

13. A protective outer sports garment as defined in claim 11 further comprising:
    said lower surface of said clear plastic housing being adhered onto said outer sports garment by a waterproof adhesive material.

14. A protective outer sports garment as defined in claim 9 further comprising:

a housing member having a lower surface with an adhesive bond for attachment to said garment;

said liquid crystal thermometer having a thermometric element encased in a secondary housing;

said secondary housing adhered to an upper surface of said housing member with an adhesive bond that is weaker than the adhesive bond of the housing member to the garment.

15. A protective outer sports garment as defined in claim 9 further comprising:

said garment being a winter outdoor weather protective garment;

said liquid crystal thermometer registering temperature below freezing on winter sports garments which has built-in heat insulation material.

16. A protective outer sports garment comprising:

an area on said sports garment with a heat insulation layer to reduce body heat from passing therethrough;

a flexible non-powered liquid crystal thermometer connected on an exterior side of the sports garment over the heat insulation material and positioned to be viewed by the wearer;

said liquid crystal thermometer being in thermal connection to the ambient exterior over the heat insulation material for providing temperature indication of the ambient exterior with insignificant thermal loads registering from said wearer.

17. A protective outer sports garment as defined in claim 16 further comprising:

said liquid crystal thermometer being encased in a clear plastic housing of which a portion of the plastic housing under the liquid crystal thermometer being said heat insulation layer.

18. A protective outer sports garment as defined in claim 17 further comprising:

said clear plastic material having an upper portion forming a recess window through which liquid crystal thermometer is viewed;

said recess window being shaped to receive a replacement liquid crystal thermometer.

19. A protective outer sports garment as defined in claim 18 further comprising:

a replacement liquid crystal thermometer element encased in a clear plastic second housing shaped to be received and adhered to the recess window.

20. A protective outer sports garment as defined in claim 18 further comprising:

said lower surface of said clear plastic housing being adhered onto said outer sports garment by a waterproof adhesive material.

21. A protective outer sports garment as defined in claim 16 further comprising:

a housing member having a lower surface with an adhesive bond for attachment to said garment;

said liquid crystal thermometer having a thermometric element encased in a secondary housing;

said secondary housing adhered to an upper surface of said housing member with an adhesive bond that is weaker than the adhesive bond of the housing member to the garment.

22. A protective outer sports garment as defined in claim 16 further comprising:

said garment being a window outdoor weather protective garment;

said liquid crystal thermometer registering temperature below freezing on winter sports garments which has built-in heat insulation material.

* * * * *

UNITED STATES PATENT AND TRADEMARK OFFICE
CERTIFICATE OF CORRECTION

PATENT NO. : 6,889,388 B1
DATED : May 10, 2005
INVENTOR(S) : Elias Barlia

It is certified that error appears in the above-identified patent and that said Letters Patent is hereby corrected as shown below:

Column 1,
Line 15, after "need to", delete "known" and insert -- know --.
Line 47, after "to being", delete "is placed" and insert -- misplaced --.

Column 3,
Line 28, after "jeopardizing", delete "has" and insert -- his --.
Line 42, after "which the", delete "indica" and insert -- indicia --.
Line 57, after "waders", insert -- 10. --.

Column 4,
Line 12, after "entire", delete "live" and insert -- life --.
Line 15, after "replacement", delete "path" and insert -- patch --.
Line 26, after "below the", delete "path" and insert -- patch --.

Column 5,
Line 11, after "therebetween", delete "the".

Column 6,
Line 32, after "waterproof", delete "of".

Column 8,
Line 31, after "being a", delete "window" and insert -- winter --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,889,388 B1
DATED : May 10, 2005
INVENTOR(S) : Elias Barlia

It is certified that error appears in the above-identified patent and that said Letters Patent is hereby corrected as shown below:

Column 4,
Line 59, after "for", delete "Artic" and insert -- Arctic --.
Line 59, after "or", delete "Antarctica" and insert -- Antarctic --.

Column 5,
Line 2, after "glove", delete "alloys" and insert -- allows --.
Line 2, after "thermometer", delete "for" and insert -- by --.

Signed and Sealed this

Twenty-fifth Day of October, 2005

JON W. DUDAS
*Director of the United States Patent and Trademark Office*